July 10, 1945.    P. S. HARPER    2,379,854
GAS VALVE
Filed Sept. 23, 1940    2 Sheets-Sheet 1
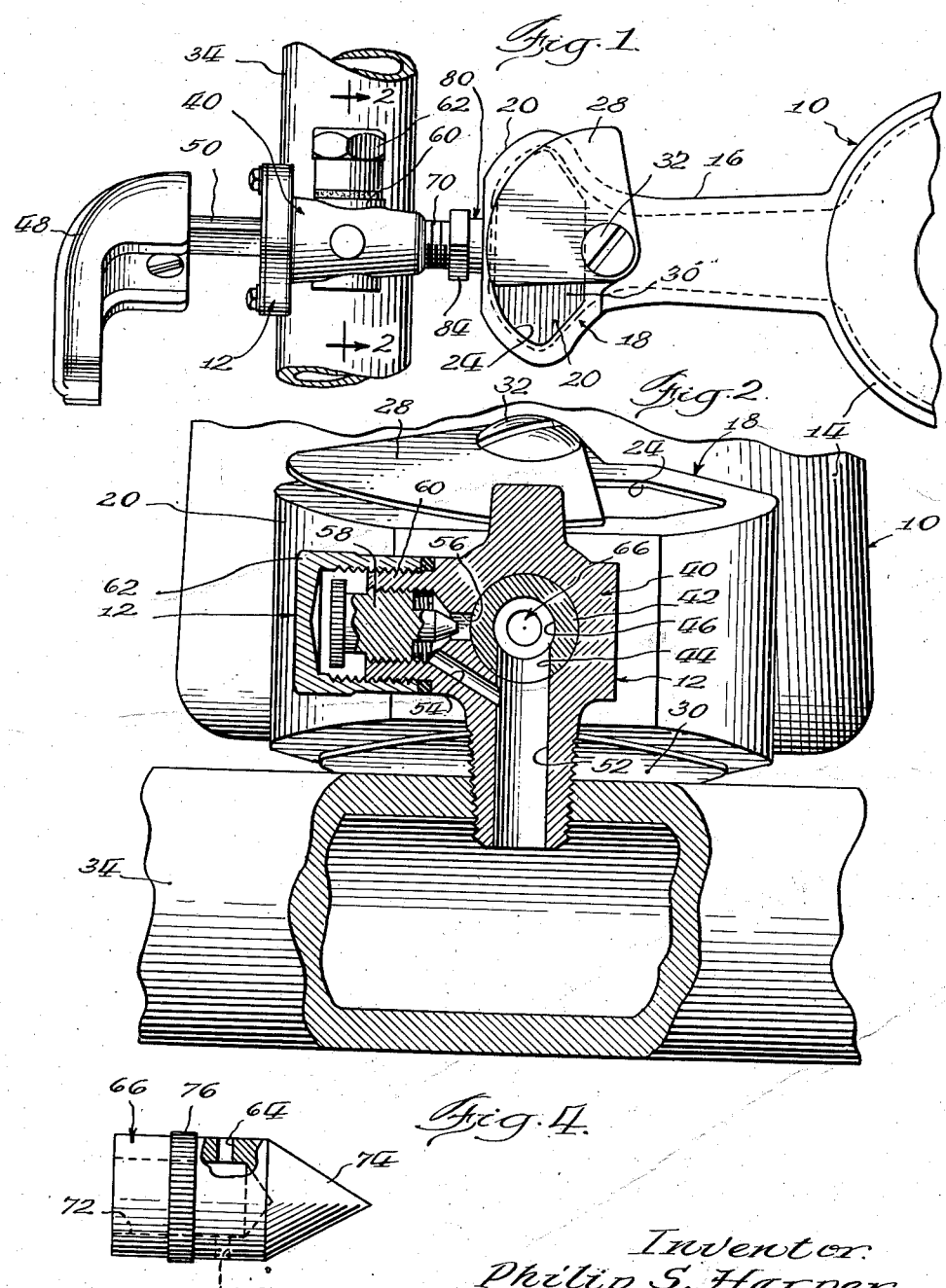

July 10, 1945.  P. S. HARPER  2,379,854
GAS VALVE
Filed Sept. 23, 1940  2 Sheets-Sheet 2
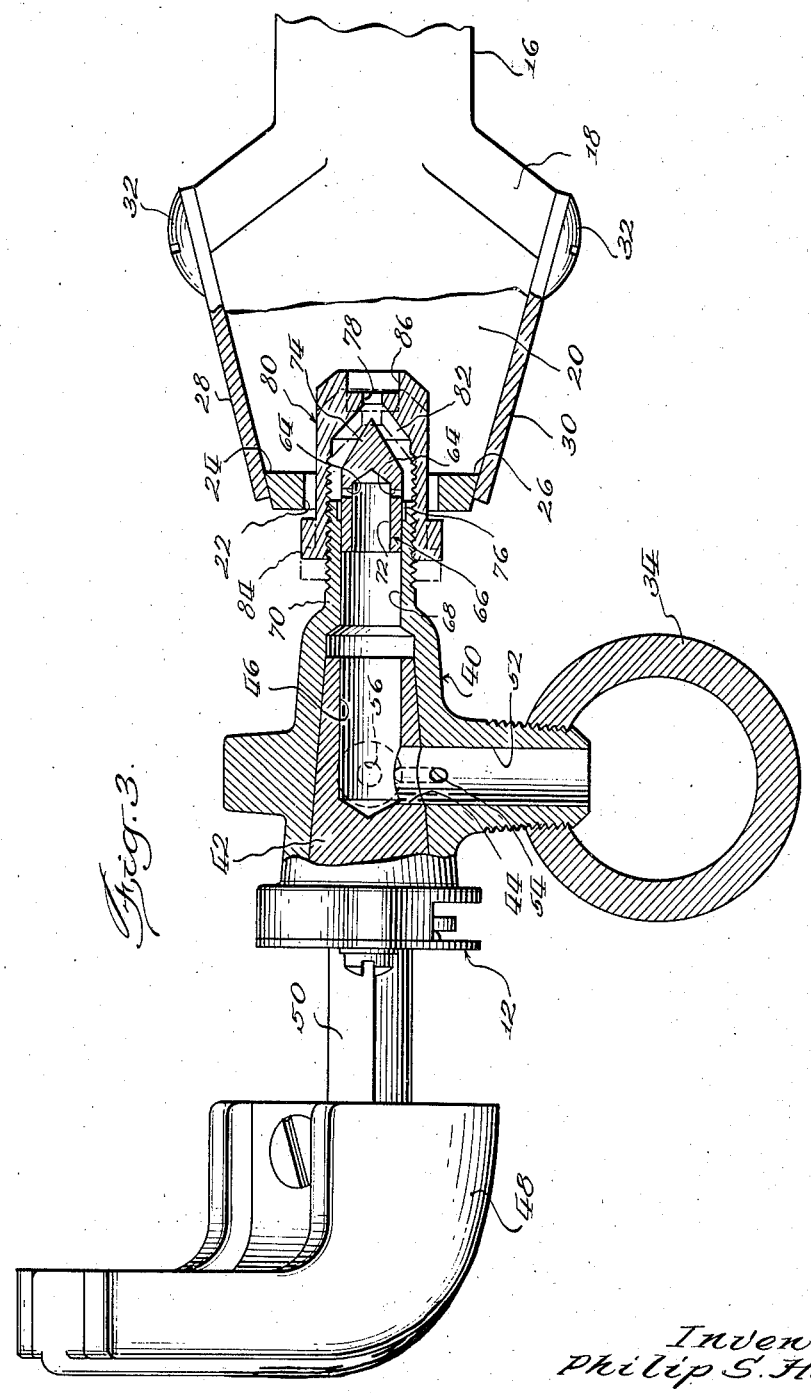
Inventor.
Philip S. Harper
By Williams, Bradbury & Hinkle
Attys Patented July 10, 1945

2,379,854

UNITED STATES PATENT OFFICE 2,379,854

GAS VALVE

Philip S. Harper, Chicago, Ill., assignor to Harper-Wyman Company, Chicago, Ill., a corporation of Illinois Application September 23, 1940, Serial No. 357,869

1 Claim. (Cl. 158—118)

The present invention relates to a gas valve and particularly to the provision of new and improved adjustable velocity gas valve for obtaining the requisite primary air injection in gas burner applications, especially in applications where but a relatively small amount of primary air is required.

Gas burners and mixing Venturi tubes used in conjunction therewith must be designed for use with a variety of gases. Some gases require a considerable amount of primary air and others require but a small amount. The primary air is entrained by the gas jets projected from the orifices of gas supply control valves into the throats of the mixing tubes leading to the burners. The mixing tubes are designed for average requirements and are equipped with manually adjustable air shutters operable under normal conditions satisfactorily to regulate the amount of primary air entrained by the jets.

In applications where fluid fuels such as butane-air are used and where the fuel projected from the orifice is already mixed with a large proportion of primary air, means other than the usual air shutter must be resorted to in order properly to regulate the entrainment of primary air. The ordinary jet entrains too much primary air, and if the shutters are adjusted to supply the requisite amount of air, their adjustment becomes critical and the small shutter openings resulting from decreasing the air supply are likely to become clogged by lint, boilovers or other extraneous matter, thus disturbing the adjustment or rendering the burner substantially inoperative.

It is possible to adjust the primary supply of air entrained by the fluid fuel jet by controlling either the velocity or the direction of the jet, but the arrangements heretofore utilized for effecting such control have not been satisfactory. According to one arrangement that has been used extensively with air-mixed gases, the gas valve is provided with an orifice having a long fixed extension on its outlet end constituting what may be called an expansion chamber. The gas passing through the orifice expands in the chamber and, as a result, its velocity is reduced. The velocity reduction depends upon the length of the expansion chamber, and consequently adjustment can be effected only by cutting off a portion of the extension. This necessitates partial dismantling of the burner assembly at least once, and usually a number of times, before the proper velocity can be obtained. Oftentimes too much is cut off and the valve must be scrapped and the adjustment attempted again. This prior art arrangement is also open to the objection that a variable turbulence obtains, particularly when the gas is supplied to the burner at a low rate, causing the burner flame to become soft and even develop yellow tips.

Another prior art arrangement, somewhat similar to the above, comprises structure enabling the length of the expansion chamber to be adjusted without the necessity of cutting. In this arrangement a small centrally drilled orifice member is rotatably mounted within an internally threaded hood having a relatively large diameter outlet opening. The change in length and turbulence is utilized to vary the jet velocity to obtain a different ratio between air and gas. This arrangement is open to the same objections as that first described—i. e., the burner assembly has to be dismantled to effect the adjustment, a number of adjustments are usually necessary, and the turbulence increases so much with decreasing jet velocities that, with a hard adjustment of flame with normal pressure at the orifice, the flame becomes yellow when the valve is turned down to cut the gas flow to one-fourth or one-fifth the normal rate.

In another arrangement the control of the proportion of primary air and gas is effected by directing the gas stream from an orifice at different angles toward the side wall of the throat of the Venturi tube. Here again dismantling of the burner assembly is required for each adjustment and several adjustments are usually required. This arrangement is also open to the objections that back pressure is often built up by the gas stream striking the Venturi tube so that gas escapes through the primary air inlets and a slight shift in the angle of the stream makes a great deal of difference in flame characteristics.

In the gas valve of the present invention, the proportion of primary air and fuel is controlled by regulating the velocity of the jet issuing from the valve, and the arrangement of the invention is such that the jet velocity may be regulated while the burner is in operation and without altering the characteristics of the jet. In brief, the arrangement consists in the utilization of a fixed area orifice and a variable area orifice, the former of which is located between the valve proper and the latter, through which the gas is discharged into the Venturi mixing tube. The variable area orifice comprises an adjustable hood accessible from the exterior of the assembly so that adjustment thereof can be made while operation of the burner can be observed. Furthermore, the adjustment is so constructed and arranged that the usual primary air controlling shutters can be left open a substantial extent, thereby to eliminate possible clogging of the shutter openings.

It is, accordingly, the primary object of the present invention to provide a new and improved gas valve comprising a variable area orifice for controlling the proportion of primary air entrained by a fuel jet.

A further object of the present invention is to provide a new and improved gas valve wherein the velocity of the gas issuing therefrom may be varied over a considerable range with comparatively little variation in the quantity of gas delivered to the burner.

Other objects and advantages of the present invention will become apparent from the ensuing description, in the course of which reference is had to the accompanying drawings, in which:

Fig. 1 is a plan view of a gas burner assembly constructed in accordance with the present invention;

Fig. 2 is an enlarged cross-sectional view illustrating details of the gas valve shown in Fig. 1, the view being taken along the line 2—2 of Fig. 1;

Fig. 3 is an enlarged side elevation of the apparatus shown in Fig. 1, the major portion of this figure being in cross section better to illustrate the details of construction of the fixed and variable area orifices by means of which the velocity of the gas jet is regulated; and Fig. 4 is a plan view partly in section showing an insert forming part of the apparatus illustrated in the preceding figures provided with a plurality of openings defining an orifice of fixed area and a conical end defining part of the variable area orifice.

Referring now to the drawings and more particularly to Figs. 1 to 3, inclusive, it may be noted that the gas valve of the present invention is shown in conjunction with a burner assembly which comprises two main elements, namely, a burner and the valve, indicated generally by reference characters 10 and 12, respectively. These may take various forms, but in order better to describe the present invention, specific forms of each have been illustrated. The burner 10 is thus illustrated as comprising a single "top" burner head 14 having a Venturi mixing tube of conventional construction formed integrally therewith. The outlet end 16 of the mixing tube opens to the burner, and the inlet end 18 forms part of a chamber 20 having a circular valve receiving aperture 22 co-axially located with respect to the axis of the mixing tube, and a pair of primary air inlet openings 24 and 26, the size of which and the air flow through which may be regulated by primary air shutters 28 and 30 adjustably secured to the top and bottom of the chamber by screws 32.

The valve 12 is illustrated as being of the high-low type, i. e., it has one position wherein a predetermined small amount of gas is supplied to the burner, a full "on" position wherein gas is supplied to the burner at a maximum rate, and intermediate positions wherein various amounts of gas are supplied to the burner dependent upon the position of the valve. However, and as already indicated, the valve may take other forms, as will become apparent as the description of the invention proceeds.

Gas is supplied to the valve through a manifold 34 which, in turn, is connected to a supply of gas (not shown), which supply is hereinafter considered as being butane-air for the purpose of better describing certain advantages of the present invention. Butane-air, it may be recalled, is a mixture of air and gas containing a considerable amount of air.

The valve 12 comprises a valve body 40 within which is mounted a control member illustrated as a plug 42 provided with intercommunicating radial and axial passageways 44 and 46. The plug is adapted to be rotated by a handle 48 secured to a valve stem 50 operatively connected to the plug in any suitable manner. The gas supply manifold 34 is connected to the peripheral surface of the valve plug by an inlet passageway 52 in the plane of movement of the radial passageway 44 in the valve plug. The inlet passageway 52 communicates with the axial passageway 46 in the valve plug either through the radial passageway 44 or through auxiliary small diameter passageways 54 and 56 (see Fig. 2), forming part of the low adjustment, depending upon the position of the valve plug. The low adjustment also comprises a needle valve 58 adjustably mounted in a low adjustment boss 60 formed integrally with the valve body 40. Undesired access to and adjustment of the needle valve is prevented by a closure cap 62.

Gas is supplied to the burner at a maximum rate when the valve plug is in the position indicated in Figs. 2 and 3, at which time the inlet passageway 52 is open directly to the radial passageway 44 in the valve plug. Gas is supplied to the burner at a low rate when the valve plug is rotated in a clockwise direction, as viewed in Fig. 2, to a position wherein the auxiliary passageway 56 is in communication with the aforementioned radial passageway. Gas is supplied to the burner at adjusted rates when the valve plug is in positions intermediate the two specifically mentioned above. The supply of gas to the burner is cut off entirely when the valve plug is rotated clockwise from the low position a distance such that the radial passageway 44 is entirely closed by the valve body.

According to the present invention, gas is projected from the valve into the mixing tube at a velocity that may be varied within considerable limits without disturbing the adjustment of the primary air shutters, while the operation of the burner may be observed, and without disturbing the true jet characteristics of the gas stream projected into the mixing tube.

The arrangement whereby these advantageous results are obtained comprises a fixed area orifice and a variable area orifice, the former being located between the valve proper and the latter, and the latter being located within the air chamber 20 so that the gas jet is projected directly into the Venturi mixing tube along with the primary air drawn in through the primary air inlets. For convenience, the fixed area orifice may be considered as being a primary orifice and the variable area orifice may be considered as being a secondary orifice.

The fixed area or primary orifice preferably comprises a pair of small diameter flow restricting orifices 64. These are constituted by diametrically opposed radial openings drilled or otherwise formed in an insert 66 pressed into a valve outlet passageway 68, defined by an outlet boss 70 and in communication with the axial passageway 46 of the valve plug. The insert is provided with an axial passageway 72 providing communication between the valve outlet passageway and the orifices 64. The insert terminates in a closed conical end 74 forming part of the variable area or secondary orifice heretofore mentioned and which will be described in detail hereinafter. The insert, which is illustrated in somewhat greater detail in Fig. 4, is provided with an annular peripheral knurled portion 76 so that it is more securely held in place when pressed into the valve outlet passageway.

The variable area or secondary orifice is constituted by the conical end 74 of the insert and an orifice 78 concentrically located with respect to the axis of the insert. Adjustment of the orifice area is effected by adjusting the distance between the conical end of the insert and the orifice, thereby to vary the velocity of the jet of gas projected through the orifice without disturbing the true jet characteristics of the gas so projected. Two positions of adjustment of the variable area orifice are indicated by the solid and phantom lines in Fig. 3. In order that the effective area of the orifice may be adjusted readily, the orifice 78 is formed at the end of a cap-like hood 80 adjustably mounted at the end of the outlet boss 70 as by providing the hood and outlet boss with internal and external threads, respectively. The internal diameter of the hood is made substantially equal to the outside diameter of the outlet boss so that the hood and insert, which has an outside diameter less than that of the outlet boss, define a chamber 82 therebetween.

The hood is provided with a nut defining portion 84 located outside the chamber 20 so that the effective size of the secondary orifice may be readily adjusted while the burner is in operation.

While the primary orifices 64 have been illustrated as a pair of radial orifices leading from the passageway 72 to the chamber 82, it should be understood that the orifices may take various forms and positions and the number thereof may be varied. The orifices, however, should open into the chamber 82 so that the gas from the outlet passageway of the valve flows first into the chamber 82 and is then projected through the orifice 78 into the mixing tube. The orifice 78 is illustrated as opening into a counter bore 86, the purpose of which is to prevent damage to the orifice, which is ordinarily of small diameter, and also to provide a construction wherein the length of the orifice may be readily controlled by the length of the counter bore.

Many advantages of the present invention have already been referred to, and others will become apparent from a description of the mode of operation and adjustment thereof.

Assuming again that the manifold 34 is connected to a supply of butane-air having a considerable amount of primary air already mixed with it, then the valve 12, with which the jet velocity adjusting means is complete as a unit, is open, for instance, to its fully open position and the burner lighted. The gas flows to the burner from the manifold through the valve inlet passageway, the radial and axial passageways 44 and 46 in the valve plug, the valve outlet passageway 68, the axial passageway 72 in the insert 66, the primary orifices 64, the chamber 82, the secondary orifice 78, and the Venturi mixing tube 16. The gas jet projected through the orifice 78 into the mixing tube draws in air through the primary air inlets 24 or 26, or both, but ordinarily only through one.

To obtain the proper adjustment of the ratio of primary air to gas, the primary air controlling shutters are first opened. Since the upper shutter is most accessible, it is opened to a substantial extent, such, for instance, as about three-eighths open, while the lower shutter is left closed. With the shutter open to the extent indicated, the air inlet will not become clogged with lint, boilovers, or other extraneous matter.

Then, while the burner flame is closely observed, the position of the hood 80 is adjusted to vary the effective size of the secondary orifice until the proper amount of primary air is entrained. Inasmuch as this adjustment is made from the exterior of the burner assembly, it can be made accurately and simply without any necessity of dismantling the assembly either once or several times as was usually the case with prior art devices.

The characteristics of the jet projected into the tube are not changed as a result of the adjustment of the jet velocity. This results from the fact that the jet is what may be termed a "true jet" at all times and there exists no turbulence that varies with the jet velocity. The arrangement of the present invention is, therefore, such that a hard or blue flame obtains not only when the maximum amount of gas is being supplied to the burner, as a result of the operation of the valve plug to its fully open position, but also in the turndown range of the valve plug as well as when the valve plug is at its low position. This results from the fact that the proportion of air to gas remains substantially constant over the normal turndown range of the valve.

Furthermore, the quantity of gas delivered to the burner is maintained within relatively close limits, while the velocity of the jet is variable over wide limits. This results from the use of the flow reducing fixed area or primary orifice through which the gas is supplied to the variable area orifice. A considerable variation in the jet velocity is easily obtainable by adjustment of the variable area orifice. Adjustment of the latter, however, does not greatly vary the amount of gas flowing to the burner as long as the size of the primary orifice is small with respect to the size of the secondary orifice. When the primary orifice is small compared with the secondary orifice, a major portion of the pressure drop in the assembly is across the primary orifice, with the net result that there is less variation in the quantity of gas supplied to the burner as a consequence of adjustments in the effective size of the secondary orifice. However, while it is preferred that the major portion of the pressure drop occur at the primary orifice, many advantages of the present invention may be realized even when the pressure drops across the orifices are equal or the pressure drop across the secondary orifice is somewhat greater than the drop across the primary orifice.

In case it is desirable to vary the rate of gas flow or the injection characteristics of the arrangement of the present invention, this may be accomplished by changing the sizes of the primary and secondary orifices. Generally speaking, an increase in flow and also in jet velocity can be obtained by making the effective area of the primary orifice somewhat larger. The jet velocity can be decreased by decreasing the effective size of the primary orifice and also by increasing the size of the secondary orifice. The size of the primary orifice may readily be decreased by eliminating one of the two orifices.

The principles of the present invention may also be applied advantageously where fluid fuels other than butane-air are utilized. For instance, the principles may also be utilized in connection with the application of gas valves to systems comprising an unduly high pressure source of either natural or manufactured gas. In this event the adjustable velocity control may be effectively utilized to reduce the velocity of the gas jet projected into the mixing tube of the burner. The principles may also be applied in installations where the pressure of the fuel supply is too high for a particular burner head. The use of the invention in systems such as those last described results from the fact that the present invention permits the velocity of the gas jet delivered to the mixing tube to be decreased below that to which it may be decreased by the ordinary adjustable jet.

It should be understood that the principles of the present invention may be utilized in connection with valves of different forms and size and construction, and that while the invention has been described in conjunction with certain preferred embodiments, these are deemed to be illustrative only.

What I claim as new and desire to secure by United States Letters Patent is:

In a gas valve including valve body structure defining an outlet passageway through which gas is adapted to be supplied to the mixing tube of a gas burner and having an effective area such that substantially full manifold pressure may exist therein, the combination including, structure supported by the valve body structure at the outer end of the outlet passageway and terminating in a closed central conical end and having the entire communication means from the structure comprising a non-adjustable fixed area flow restricting passage means, a hood spaced from and surrounding the closed conical end of said structure and cooperating with said structure to form a chamber, said hood being mounted on the valve body structure for movement relative to the conical end and terminating in an end wall having an orifice therein disposed substantially co-axially of the conical end and communicating directly with said chamber and constituting with said conical end an adjustable area velocity adjusting orifice, the area of said fixed passage means being small with respect to the areas of the outlet passageway and adjusted area of the adjustable orifice, whereby the size of the fixed area passage means primarily determines the quantity of gas supplied through the valve and the pressure drop across the fixed area passage means is large compared to the pressure drop across the adjustable area orifice and the adjustable area orifice is adjustable to vary the velocity of the gas without substantially varying the quantity of gas flowing through it.

PHILIP S. HARPER.